(12) United States Patent
Mattayan et al.

(10) Patent No.: US 11,674,022 B2
(45) Date of Patent: Jun. 13, 2023

(54) MULTIMODAL POLYETHYLENE FILM

(71) Applicants: Thai Polyethylene Co., Ltd., Bangkok (TH); SCG Chemicals Co., Ltd., Bangkok (TH)

(72) Inventors: Arunsri Mattayan, Bangkok (TH); Watcharee Cheevasrirungruang, Bangkok (TH); Saranya Traisilanun, Bangkok (TH); Warachad Klomkamol, Bangkok (TH)

(73) Assignees: Thai Polyethylene Co., Ltd., Bangkok (TH); SCG Chemicals Co., Ltd., Bangkok (TH)

( * ) Notice: Subject to any disclaimer, the term of this patent is extended or adjusted under 35 U.S.C. 154(b) by 0 days.

(21) Appl. No.: 16/332,046

(22) PCT Filed: Sep. 8, 2017

(86) PCT No.: PCT/EP2017/072587
§ 371 (c)(1),
(2) Date: Mar. 11, 2019

(87) PCT Pub. No.: WO2018/046664
PCT Pub. Date: Mar. 15, 2018

(65) Prior Publication Data
US 2020/0056022 A1     Feb. 20, 2020

(30) Foreign Application Priority Data

Sep. 12, 2016 (EP) .................................. 16188335

(51) Int. Cl.
*C08L 23/06* (2006.01)
*C08J 5/18* (2006.01)
*E02D 31/00* (2006.01)

(52) U.S. Cl.
CPC .................. *C08L 23/06* (2013.01); *C08J 5/18* (2013.01); *E02D 31/004* (2013.01); *C08J 2323/06* (2013.01); *C08J 2423/06* (2013.01); *C08L 2203/16* (2013.01); *C08L 2205/025* (2013.01); *C08L 2205/03* (2013.01); *C08L 2207/068* (2013.01); *Y10T 428/1352* (2015.01)

(58) Field of Classification Search
CPC .................. C08L 23/0815; C08L 23/06; C08L 2207/068; C08L 2205/03; C08L 2205/025; C08L 2203/16; C08L 23/04; C08J 5/18; C08J 2423/06; C08J 2323/06; E02D 31/004; C08F 210/16; C08F 2/01; C08F 210/08; C08F 2500/01; C08F 2500/02; C08F 2500/05; C08F 2500/07; C08F 2500/12; C08F 2500/17; C08F 2500/18; Y10T 428/1352
USPC ....................................................... 428/34.1
See application file for complete search history.

(56) References Cited

U.S. PATENT DOCUMENTS

| | | |
|---|---|---|
| 6,291,601 B1 | 9/2001 | Debras |
| 6,713,561 B1 | 3/2004 | Berthold et al. |
| 6,716,936 B1 | 4/2004 | McGrath et al. |
| 8,759,448 B2 | 6/2014 | Buryak et al. |
| 8,802,768 B2 | 8/2014 | Dotsch et al. |
| 2003/0191251 A1 | 10/2003 | McGrath |
| 2004/0204542 A1 | 10/2004 | Mattioli et al. |
| 2006/0074194 A1 | 4/2006 | Berthold et al. |
| 2009/0105422 A1 | 4/2009 | Berthold et al. |
| 2009/0163679 A1 | 6/2009 | Do Nascimento et al. |
| 2009/0304966 A1 | 12/2009 | Mehta et al. |
| 2010/0010163 A1 | 1/2010 | Berthold et al. |
| 2010/0016526 A1 | 1/2010 | Etherton et al. |

(Continued)

FOREIGN PATENT DOCUMENTS

| | | |
|---|---|---|
| EP | 0100843 A1 | 6/1983 |
| EP | 1041113 A1 | 10/2000 |

(Continued)

OTHER PUBLICATIONS

The Polymer Processing Society Extended Abstracts & Final Programme, Conference of Polymer Processing, Aug. 19-21, 1997.

(Continued)

*Primary Examiner* — James C Yager
(74) *Attorney, Agent, or Firm* — Banner & Witcott, Ltd.

(57) ABSTRACT

The present invention relates to a multimodal polyethylene composition comprising: (A) 40 to 65 parts by weight, preferably 43 to 52 parts by weight, most preferred 44 to 50 parts by' weight, of the low molecular weight polyethylene having a weight average molecular weight (Mw) of 20,000 to 90,000 g/mol, wherein the low molecular weight polyethylene has a MI2 of 500 to 1,000 g/10 min according to ASTM D 1238; (B) 5 to 17 parts by weight, preferably 10 to 17 parts by weight, most preferred 10 to 15 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and (C) 30 to 50 parts by weight, preferably 37 to 47 party by weight, most preferably 39 to 45 parts by weight, of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol, wherein the density of the first high molecular weight polyethylene or the first ultra high molecular weight polyethylene and the second high molecular weight polyethylene or the second ultra high molecular weight polyethylene is in the same range and both densities are in the range from 0.910 to 0.940 g/cm3; and the molecular weight distribution of the multimodal polyethylene composition is from 18 to 30, preferably 20 to 28, measured by gel permeation chromatography, film comprising the multimodal polyethylene composition and the use thereof.

14 Claims, No Drawings

(56) References Cited

U.S. PATENT DOCUMENTS

| | | |
|---|---|---|
| 2010/0035008 A1 | 2/2010 | Backman |
| 2010/0092709 A1 | 4/2010 | Joseph |
| 2010/0152383 A1 | 6/2010 | Jiang et al. |
| 2010/0301054 A1 | 12/2010 | Berthold et al. |
| 2014/0030460 A1 | 1/2014 | Monoi et al. |
| 2015/0051364 A1 | 2/2015 | Vahteri et al. |
| 2016/0347939 A1* | 12/2016 | Dou .................. C08J 3/005 |
| 2019/0256695 A1* | 8/2019 | Liu .................. C08L 23/0815 |

FOREIGN PATENT DOCUMENTS

| | | |
|---|---|---|
| EP | 1201713 A1 | 5/2002 |
| EP | 1460105 A1 | 9/2004 |
| EP | 1417260 B1 | 8/2005 |
| EP | 1578862 B1 | 9/2005 |
| EP | 1655334 A1 | 5/2006 |
| EP | 1576047 B1 | 7/2006 |
| EP | 1576049 B1 | 7/2006 |
| EP | 2017302 A1 | 1/2009 |
| EP | 2130863 A1 | 12/2009 |
| EP | 2354184 A1 | 8/2011 |
| EP | 2407506 A1 | 1/2012 |
| EP | 2365995 B1 | 12/2012 |
| EP | 2743305 A1 | 6/2014 |
| EP | 2668231 B1 | 10/2014 |
| EP | 2907843 A1 | 8/2015 |
| HU | 0800771 A2 | 10/2010 |
| JP | 2012-067914 A | 4/2012 |
| WO | 9618677 A1 | 6/1996 |
| WO | 2004056921 A1 | 7/2004 |
| WO | 2006092377 A1 | 9/2006 |
| WO | 2006092378 A1 | 9/2006 |
| WO | 2006092379 A1 | 9/2006 |
| WO | 2007003530 A1 | 1/2007 |
| WO | 2007042216 A1 | 4/2007 |
| WO | 2007045415 A1 | 4/2007 |
| WO | 2008006487 A1 | 1/2008 |
| WO | 2008049551 A1 | 5/2008 |
| WO | 2008131817 A1 | 11/2008 |
| WO | 2009/003627 A1 | 1/2009 |
| WO | 2009077142 A1 | 6/2009 |
| WO | 2009147022 A1 | 12/2009 |
| WO | 2010025342 A2 | 3/2010 |
| WO | 2012069400 A1 | 5/2012 |
| WO | 2013101767 A2 | 7/2013 |
| WO | 2013113797 A1 | 8/2013 |
| WO | 2013144324 A1 | 10/2013 |
| WO | 2013144328 A1 | 10/2013 |
| WO | 2014091501 A1 | 6/2014 |
| WO | 2015121161 A1 | 8/2015 |
| WO | 2019229209 A1 | 12/2019 |

OTHER PUBLICATIONS

Melt Flow Index, Wikipedia (2022).
Nov. 9, 2017—International Search Report and Written Opinion—Appl. No. PCT/EP2017/072587.

* cited by examiner

MULTIMODAL POLYETHYLENE FILM

CROSS-REFERENCE TO RELATED APPLICATIONS

This application is a U.S. National Stage application under 35 U.S.C. § 371 of International Application PCT/EP2017/072587 (published as WO 2018/046664 A1), filed Sep. 8, 2017, which claims the benefit of priority to Application EP 16188335.0, filed Sep. 12, 2016. Benefit of the filing date of each of these prior applications is hereby claimed. Each of these prior applications is hereby incorporated by reference in its entirety.

The present invention relates to a multimodal polyethylene composition for producing film The demand of polyethylene resins is increasingly being used in a variety of applications. As required high performance of polyethylene for a relatively new plastic, a polymerization process technology has been developed to support new polymeric material production. In order for balancing processability and physical properties of ethylene copolymers, the development in multimodal polymerization process has been investigated.

In the prior art, multimodal polyethylene polymerization is employed to produce polymers having different molecular weights by creating each resin fraction in separated reactors. A low molecular weight fraction is produced in a reactor using an excess of hydrogen to control the molecular weight of the polymer suitable for providing good processability of the final polymer.

A high molecular weight fraction which has an influence on the physical properties and is produced under polymerization conditions with low hydrogen concentration. It is well known in the art that low molecular weight polymer is preferably produced in a first reactor. To obtain a multimodal polymer with good physical properties, all hydrogen from the first reactor should be removed before the polymerized slurry polymer is passed to a second reactor in which the production of high molecular weight polymer takes place.

EP 1 655 334 A1 discloses the multimodal production of an ethylene polymer which is produced in a multistage process with a $MgCl_2$-based Ziegler-Natta catalyst. The polymerization stages are performed in the following order to achieve firstly an ultra high molecular weight polymer, followed by achieving a low molecular weight polymer, and finally achieving high molecular weight polymer in the last step. The polymerization catalyst is charged to a prepolymerization step to make an ultrahigh molecular weight fraction.

WO 2013/144328 describes a composition of multimodal high density polyethylene which is produced using a Ziegler-Natta catalyst for use in molding applications. A small fraction of ultra-high polyethylene of less than 15% by weight is produced in a third reactor.

US 2009/0105422 A1 describes a process for producing a multimodal polyethylene. The polymerization is carried out in three cascade reactors, wherein the molecular weight of the polymer in each reactor is controlled by the presence of hydrogen. The concentration of the hydrogen in each reactor is reduced subsequently by providing the highest hydrogen concentration in the first reactor and the lowest hydrogen concentration in the third reactor.

WO 2013/113797 describes a process for polyethylene preparation comprising three main subsequent steps of polymerized ethylene and at least one other α-olefin to get the polyethylene with, respectively, a lower molecular weight ethylene polymer, a first higher molecular weight ethylene polymer and a second higher molecular weight ethylene polymer in accordance with the sequence of a first reactor, a second reactor and a third reactor.

It is an object to provide a multimodal polyethylene composition overcoming drawbacks of the prior art, in particular having improved mechanical properties, such as Charpy impact strength.

A variety of films, which may be applied as the single layer or to the core or the surface of the multi-layer films, are known in the art. Likewise, a variety of polymer compositions, in particular polyethylene compositions, for producing such films are described.

WO 2006/092377 A1 discloses a polyethylene molding composition for producing blown films.

The composition is a multimodal polyethylene composition comprising a homopolymer and two different copolymers. Furthermore, the polymer composition has specific $MFR_5$ and density.

WO 2006/092379 A1 describes a multimodal polyethylene molding composition comprising a homopolymer and two different copolymers. The composition has a specific $MFR_5$ and a specific density and is described to be suitable for producing blown films.

However, also in light of the above prior art, there is still a need to provide multimodal polyethylene compositions for preparing films and films prepared by using multimodal polyethylene compositions overcoming drawbacks of the prior art, in particular to provide high density polyethylene compositions for producing blown films having improved properties regarding output, bubble stability, mechanical strength, seal strength and toughness, in particular for producing such films having a thickness of about 45 μm or more.

Therefore, it is the further object of the present invention to provide multimodal polyethylene compositions for preparing films and films prepared this way overcoming drawbacks of the prior art, in particular overcoming the drawbacks mentioned above.

This object is achieved in accordance with the invention according to the subject-matter of the independent claims. Preferred embodiments result from the sub-claims.

The object is achieved by a multimodal polyethylene composition comprising:

(A) 40 to 65 parts by weight, preferably 43 to 52 parts by weight, most preferred 44 to 50 parts by weight, of the low molecular weight polyethylene, wherein the low molecular weight polyethylene has a $MI_2$ of 500 to 1,000 g/10 min according to ASTM D 1238;

(B) 5 to 17 parts by weight, preferably 10 to 17 parts by weight, most preferred 10 to 15 parts by weight, of the first high molecular weight polyethylene or the first ultra high molecular weight polyethylene; and (C) 30 to 50 parts by weight, preferably 37 to 47 party by weight, most preferably 39 to 45 parts by weight, of the second high molecular weight polyethylene or the second ultra high molecular weight polyethylene, wherein the density of the first high molecular weight polyethylene or the first ultra high molecular weight polyethylene and the second high molecular weight polyethylene or the second ultra high molecular weight polyethylene is in the same range and both densities are in the range from 0.910 to 0.940 $g/cm^3$; and the polydispersity index of the multimodal polyethylene composition is from 18 to 30, preferably 20 to 28, measured by gel permeation chromatography.

Preferably, the polydispersity index of the multimodal polyethylene composition is from 20 to 26, preferably from 22 to 24.

It is further preferred that the multimodal polyethylene composition has a weight average molecular weight from 150,000 to 400,000 g/mol, preferably 200,000 to 300,000 g/mol, measured by Gel Permeation Chromatography.

In a further preferred embodiment, the multimodal polyethylene composition has a number average molecular weight from 5,000 to 15,000 g/mol, preferably 7,000 to 13,000 g/mol, measured by Gel Permeation Chromatography.

Preferably, the multimodal polyethylene composition has a Z average molecular weight from 1,000,000 to 3,000,000 g/mol, preferably 1,000,000 to 2,500,000 g/mol, measured by Gel Permeation Chromatography.

It is further preferred that the multimodal polyethylene composition has a density of at least 0.940 g/cm$^3$, preferably 0.940 to 0.948 g/cm$^3$, according to ASTM D 1505 and/or MI$_2$ from 0.03 to 0.10 g/10 min.

More preferred, the MI$_2$ is from 0.03 to 0.08 g/10 min.

The object is further achieved by a the film has a thickness from 40 to 120 m, preferably from 45 to 80 m.

The object is further achieved by the use of the inventive film as an industrial bag or as a geomembrane.

The object is further achieved by a process for producing a multimodal polyethylene composition in an inventive reactor system, comprising (in this sequence);

(a) polymerizing ethylene in an inert hydrocarbon medium in the first reactor in the presence of a catalyst system, selected from Ziegler-Natta catalyst or metallocene, and hydrogen in an amount of 0.1-95% by mol with respect to the total gas present in the vapor phase in the first reactor to obtain a low molecular weight polyethylene or a medium molecular weight polyethylene;

(b) removing in the hydrogen removal unit 98.0 to 99.8% by weight of the hydrogen comprised in a slurry mixture obtained from the first reactor at a pressure in the range of 103-145 kPa (abs) and transferring the obtained residual mixture to the second reactor;

(c) polymerizing ethylene and optionally C$_4$ to C$_{12}$ α-olefin comonomer in the second reactor in the presence of a catalyst system, selected from Ziegler-Natta catalyst or metallocene, and in the presence of hydrogen in an amount obtained in step (b) to obtain a first high molecular weight polyethylene or a first ultra high molecular weight polyethylene in the form of a homopolymer or a copolymer and transferring a resultant mixture to the third reactor; and (d) polymerizing ethylene and optionally C$_4$ to C$_{12}$ α-olefin comonomer in the third reactor in the presence of a catalyst system, selected from Ziegler-Natta catalyst or metallocene, and hydrogen, wherein the amount of hydrogen in the third reactor is in a range of 0.1-70% by mol, preferably 0.1-60% by mol, with respect to the total gas present in the vapor phase in the third reactor or optionally substantial absence of hydrogen to obtain a second high molecular weight polyethylene or a second ultra high molecular weight polyethylene homopolymer or copolymer.

"Substantially absence" in this regard means that hydrogen is only comprised in the third reactor in an amount which cannot be avoided by technical means.

The slurry mixture obtained from the first reactor and subjected to the step of removing hydrogen in the hydrogen removal unit contains all of the solid and liquid constituents obtained in the first reactor, in particular the low molecular weight polyethylene or the medium molecular weight polyethylene. Furthermore, the slurry mixture obtained from the first reactor is saturated with hydrogen regardless the amount of hydrogen used in the first reactor.

Preferably, the removing is removing of 98.0 to 99.8% by weight of the hydrogen, and more preferable 98.0 to 99.5% by weight, most preferred 98.0 to 99.1% by weight.

Preferably, the operation pressure in the hydrogen removal unit is in the range of 103-145 kPa(abs), more preferably 104-130 kPa (abs), most preferred 105 to 115 kPa (abs).

Preferably, step (a) results in the low molecular weight polyethylene or medium molecular weight polyethylene, step (c) results in high molecular weight polyethylene or the ultra high molecular weight polyethylene, and step (d) results in high molecular weight polyethylene or the ultra high molecular weight polyethylene.

The weight average molecular weight (Mw) of the low molecular weight polyethylene, the medium molecular weight polyethylene, the high molecular weight polyethylene and the ultra high molecular weight polyethylene described herein are in the range of 20,000-90,000 g/mol (low), more than 90,000-150,000 g/mol (medium), more than 150,000-1,000,000 g/mol (high) and more than 1,000,000-5,000,000 g/mol (ultra high) respectively.

Finally, the object is achieved by a multimodal polyethylene composition obtainable by the inventive process, comprising;

(A) 40 to 65 parts by weight, preferably 43 to 52 parts by weight, most preferred 44 to 50 parts by weight, of the low molecular weight polyethylene, wherein the low molecular weight polyethylene has a MFR$_2$ of 500 to 1,000 g/10 min according to ASTM D 1238;

(B) 5 to 17 parts by weight, preferably 10 to 17 parts by weight, most preferred 10 to 15 parts by weight, of the first high molecular weight polyethylene or the first ultra high molecular weight polyethylene; and (C) 30 to 50 parts by weight, preferably 37 to 47 party by weight, most preferably 39 to 45 parts by weight, of the second high molecular weight polyethylene or the second ultra high molecular weight polyethylene, wherein the density of the first high molecular weight polyethylene or the first ultra high molecular weight polyethylene and the second high molecular weight polyethylene or the second ultra high molecular weight polyethylene is in the same range and both densities are in the range from 0.910 to 0.940 g/cm$^3$, them polydispersity index of the multimodal polyethylene composition is from 18 to 30, preferably 20 to 28, measured by Gel Permeation Chromatography.

In a preferred embodiment, the multimodal polyethylene composition has a weight average molecular weight from 150,000 to 400,000 g/mol, preferably 200,000 to 300,000 g/mol, measured by Gel Permeation Chromatography.

Furthermore, it is preferred, that the multimodal polyethylene composition has a number average molecular weight from 5,000 to 15,000 g/mol, preferably 7,000 to 13,000 g/mol, measured by Gel Permeation Chromatography.

Preferably, the multimodal polyethylene composition has a Z average molecular weight from 1,000,000 to 3,000,000 g/mol, preferably 1,000,000 to 2,500,000 g/mol, measured by Gel Permeation Chromatography.

Preferably, the multimodal polyethylene composition has a density of at least 0.940 g/cm$^3$, preferably 0.940 to 0.948 g/cm$^3$, according to ASTM D 1505 and/or MI$_2$ from 0.03 to 0.15 g/10 min, preferably 0.03 to 0.10 g/10 min.

Furthermore, the object is achieved by a film comprising the inventive multimodal polyethylene composition, wherein the film has a thickness from 40 to 120 am, preferably from 45 to 80 am.

Regarding the inventive film, it is preferred that the film substantially comprises the inventive multimodal polyethylene composition, which means that the film does comprise further constituents only in amounts which do not affect the film properties regarding output, bubble stability, mechanical strength, toughness and the like. Most preferred, the film is consisting of the inventive multimodal polyethylene composition.

Finally, the object is achieved by the use of the inventive film as an industrial bag or as a geomembrane.

A geomembrane is a low permeability synthetic membrane liner or barrier used for any geotechnical engineering to control fluid (or gas) migration in a human-made project, structure, or system.

In preferred embodiments of the inventive reactor system, the inventive process, the inventive multimodal polyethylene composition and the inventive film "comprising" is "consisting of".

In preferred embodiments "parts by weight" is "percent by weight".

The above embodiments mentioned to be preferred resulted in even more improved mechanical properties of the obtained multimodal polyethylene composition and the film prepared therefrom. Best results were achieved by combining two or more of the above preferred embodiments. Likewise, the embodiments mentioned above to be more or most preferred resulted in the best improvement of mechanical properties.

Surprisingly, it was found by the inventors that by using the inventive reactor system to produce an inventive multimodal polyethylene composition by the inventive process allows to form an inventive film using the inventive composition which is superior over the prior art. In particular, it was found by the inventors that by using the inventive multimodal polyethylene composition, a blown film can be prepared with high output, good bubble stability, high mechanical strength, high seal strength and high toughness, in particular a film of a thickness between 40 to 120 micron, preferably about 45 micron.

The invention concerns a reactor system for multimodal polyethylene polymerization. The system comprises a first reactor, a second reactor, a third reactor and a hydrogen removal unit placed between the first reactor and the second reactor.

The hydrogen depleted polyethylene from the first reactor affects the polymerization of high molecular weight in the subsequent reactors. In particular, high molecular weight leads to improved mechanical properties of polyethylene that is the advantage for various product application includes injection molding, blow molding and extrusion. The catalyst for producing the multimodal polyethylene resin of this invention is selected from a Ziegler-Natta catalyst, a single site catalyst including metallocene-bases catalyst and non-metallocene-bases catalyst or chromium based might be used, preferably conventional Ziegler-Natta catalyst or single site catalyst. The catalyst is typically used together with cocatalysts which are well known in the art.

Inert hydrocarbon is preferably aliphatic hydrocarbon including hexane, isohexane, heptane, isobutane. Preferably, hexane (most preferred n-hexane) is used. Coordination catalyst, ethylene, hydrogen and optionally α-olefin comonomer are polymerized in the first reactor. The entire product obtained from the first reactor is then transferred to the hydrogen removal unit to remove 98.0 to 99.8% by weight of hydrogen, unreacted gas and some volatiles before being fed to the second reactor to continue the polymerization. The polyethylene obtained from the second reactor is a bimodal polyethylene which is the combination of the product obtained from the first reactor and that of the second reactor. This bimodal polyethylene is then fed to the third reactor to continue the polymerization. The final multimodal (trimodal) polyethylene obtained from the third reactor is the mixture of the polymers from the first, the second and the third reactor.

The polymerization in the first, the second and the third reactor is conducted under different process conditions. As a result, the polyethylene obtained in each reactor has a different molecular weight. These can be the variation in concentration of ethylene and hydrogen in the vapor phase, temperature or amount of comonomer being fed to each reactor. Appropriate conditions for obtaining a respective homo- or copolymer of desired properties, in particularly of desired molecular weight, are well known in the art. The person skilled in the art is enabled on basis of his general knowledge to choose the respective conditions on this basis. Preferably, low molecular weight polyethylene or medium molecular weight polyethylene is produced in the first reactor, while high molecular weight polyethylene or ultra high molecular weight polyethylene is produced in the second and third reactor respectively.

The term first reactor refers to the stage where the low molecular weight polyethylene (LMW) or the medium molecular weight polyethylene (MMW) is produced. The term second reactor refers to the stage where the first high or ultra high molecular weight polyethylene (HMW1) is produced. The term third reactor refers to the stage where the second high molecular weight polyethylene or ultra high molecular weight (HMW2) is produced.

The term LMW refers to the low molecular weight polyethylene polymer polymerized in the first reactor having a weight average molecular weight (Mw) of 20,000-90,000 g/mol.

The term MMW refers to the medium molecular weight polyethylene polymer polymerized in the first reactor having a weight average molecular weight (Mw) of more than 90,000-150,000 g/mol.

The term HMW1 refers to the high or ultra high molecular weight polyethylene polymer polymerized in the second reactor having a weight average molecular weight (Mw) of more than 150,000 to 5,000,000 g/mol.

The term HMW2 refers to the high or ultra high molecular weight polyethylene polymer polymerized in the third reactor having the weight average molecular weight (Mw) of more than 150,000 to 5,000,000 g/mol.

The LMW or MMW is produced in the first reactor in the absence of comonomer in order to obtain a homopolymer.

To obtain the improved polyethylene properties of this invention, ethylene is polymerized in the first reactor in the absence of comonomer in order to obtain high density LMW polyethylene or MMW polyethylene having density ≥0.965 g/cm$^3$ and MI$_2$ in the range of 10-1000 g/10 min for LMW and 0.1-10 g/10 min for MMW. In order to obtain the target density and MI in the first reactor, the polymerization conditions are controlled and adjusted. The temperature in the first reactor ranges from 70-90° C., preferably 80-85° C. Hydrogen is fed to the first reactor so as to control the molecular weight of the polyethylene. The molar ratio of hydrogen to ethylene in the vapor phase can be varied depending up on the target MI. However, the preferred molar ratio ranges from 0.01-8.0, more preferably 0.01-6.0.

The first reactor is operated at pressure between 250 and 900 kPa, preferably 400-850 kPa. An amount of hydrogen present in the vapor phase of the first reactor is in the range of 0.1-95% by mole, preferably 0.1-90% by mol.

Before being fed to the second reactor, the slurry obtained from the first reactor containing LMW or MMW polyethylene preferably in hexane is transferred to a hydrogen removal unit which may have a flash drum connected with depressurization equipment preferably including one or the combination of vacuum pump, compressor, blower and ejector where the pressure in the flash drum is reduced so that volatile, unreacted gas, and hydrogen are removed from the slurry stream. The operating pressure of the hydrogen removal unit typically ranges from 103-145 kPa(abs), preferably 104-130 kPa(abs) in which 98.0 to 99.8% by weight of hydrogen can be removed, preferably 98.0 to 99.5% by weight and most preferred 98.0 to 99.1% by weight.

In this invention, when 98.0 to 99.8% by weight of hydrogen is removed and the polymerization undergoes under these conditions of hydrogen content, very high molecular weight polymer can be achieved this way and Charpy impact strength and Flexural modulus are improved. It was surprisingly found that working outside the range of 98.0 to 99.8% by weight of hydrogen removal, the inventive effect of obtaining very high molecular weight polymer and improving Charpy Impact an Flexural Modulus could not be observed to the same extend. The effect was more pronounced in the ranges mentioned to be preferred.

The polymerization conditions of the second reactor are notably different from that of the first reactor. The temperature in the second reactor ranges from 65-90° C., preferably 68-80° C. The molar ratio of hydrogen to ethylene is not controlled in this reactor since hydrogen is not fed into the second reactor. Hydrogen in the second reactor is the hydrogen left over from the first reactor that remains in slurry stream after being flashed at the hydrogen removal unit. Polymerization pressure in the second reactor ranges from 100-3000 kPa, preferably 150-900 kPa, more preferably 150-400 kPa.

Hydrogen removal is the comparison result of the amount of the hydrogen present in the slurry mixture before and after passing through the hydrogen removal unit. The calculation of hydrogen removal is performed according to the measurement of gas composition in the first and the second reactor by gas chromatography.

After the substantial amount of hydrogen is removed to achieve the inventive concentration, slurry from the hydrogen removal unit is transferred to the second reactor to continue the polymerization. In this reactor, ethylene can be polymerized with or without α-olefin comonomer to form HMW1 polyethylene in the presence of the LMW polyethylene or MMW polyethylene obtained from the first reactor. The α-olefin comomer that is useful for the copolymerization includes $C_{4-12}$, preferably 1-butene and 1-hexene.

After the polymerization in the second reactor, the slurry obtained is transferred to the third reactor to continue the polymerization.

The HMW2 is produced in the third reactor by polymerizing ethylene with optionally α-olefin comonomer at the presence of LMW or MMW and HMW1 obtained from the first and second reactor. The α-olefin comonomer that is useful for the copolymerization include $C_{4-12}$, preferably 1-butene and 1-hexene.

In order to obtain the target Density and the target MI in the third reactor, the polymerization conditions are controlled and adjusted. However, the polymerization conditions of the third reactor are notably different from the first and second reactor. The temperature in the third reactor ranges from 68-90° C. preferably 68-80° C. Hydrogen is optionally fed to the third reactor so as to control the molecular weight of polyethylene. The molar ratio of hydrogen to ethylene can be varied depending up on the target MI. However, the preferred molar ratio ranges from 0.01-2.0. Polymerization pressure in the third reactor ranges from 250-900 kPa, preferably 250-600 kPa, and is controlled by the addition of inert gas such as nitrogen.

The amount of LMW or MMW present in the multimodal polyethylene composition of the present invention is 30-65 parts by weight. HMW1 present in the polyethylene of the present invention is 5-40 parts by weight and HMW2 present in the polyethylene of the present invention is 10-60 parts by weight. It is possible that HMW1>HMW2 or HMW1<HMW2 depending on the polymerization conditions employed.

The final (free-flow) multimodal polyethylene composition is obtained by separating hexane from the slurry discharged from the third reactor.

The resultant polyethylene powder may then be mixed with antioxidants and optionally additives before being extruded and granulated into pellets.

Definition and Measurement Methods $MI_2$: Melt flow rate (MFR) of polyethylene was measured according to ASTM D 1238 and indicated in g/10 min that determines the flowability of polymer under testing condition at 190° C. with load 2.16 kg.

Density: Density of polyethylene was measured by observing the level to which a pellet sinks in a liquid column gradient tube, in comparison with standards of known density. This method is determination of the solid plastic after annealing at 120° C. follow ASTM D 1505.

Molecular weight and Polydispersity index (PDI): The weight average molecular weight (Mw), the number average molecular weight (Mn) and the Z average molecular weight (Mz) in g/mol were analysed by gel permeation chromatography (GPC). Polydispersity index was calculated by Mw/Mn. Around 8 mg of sample was dissolved in 8 ml of 1,2,4-trichlorobenzene at 160° C. for 90 min. Then the sample solution, 200 al, was injected into the high temperature GPC with IR5, an infared detector (Polymer Char, Spain) with flow rate of 0.5 ml/min at 145° C. in column zone and 160° C. in detector zone. The data was processed by GPC One® software, Polymer Char, Spain.

Intrinsic Viscosity (IV)

The test method covers the determination of the dilute solution viscosity of PE at 135° C. or ultra high molecular weight polyethylene (UHMWPE) at 150° C. The polymeric solution was prepared by dissolving polymer in Decalin with 0.2% wt/vol stabilizer (Irganox 1010 or equivalent). The details are given for the determination of IV followed ASTM D2515.

Crystallinity: The crystallinity is frequently used for characterization by Differential Scanning Calorimetry (DSC) follow ASTM D 3418. Samples were identified by peak temperature and enthalpy, as well as the % crystallinity was calculated from the peak area.

Charpy impact strength: Charpy impact strength is determined according to ISO179 at 23° C., 0° C. and −20° C. and showed in the unit $kJ/m^2$.

Flexural Modulus: The specimen was prepared and performed the test according to ISO178. The flexural tests were done using a universal testing machine equipped with three point bending fixture.

Film bubble stability: It was determined during the blown film process, the axial oscillation of the film bubble was observed during increasing the nip roll take up speed and continue more than 30 minute. Good bubble stability is defined when film is not oscillating and bubble is not break.

Output: The film was blown following the blown film conditions. Then the film was collected for a minute and weight. The output of film from unit of g/min is then calculated and reported in the unit of kg/hr.

Dart drop impact: This test method follow method A of ASTM D1709 that covers the determination of the energy that cause plastic film to fail under specified conditions of free-falling dart impact. This energy is expressed in terms of the weight of the falling from a specified height, 0.66±0.01 m, which result in 50% failure of specimens tested.

Puncture Resistance: This testing is SCG in-housed method that a specimen is clamped without tension between circular plates of a ring clamp attachment in UTM. A force is exerted against the center of the unsupported portion of the test specimen by a solid steel rod attached to the load indicator until rupture of specimen occurs. The maximum force recorded is the value of puncture resistance Tensile strength of film: These test methods cover the determination of tensile properties of film (less than 1.0 mm. in thickness) followed ASTM D882. The testing employs a constant rate of grip separation, 500 mm/min.

Tear strength: This test method covers the determination of the average force to propagate tearing through a specified length of plastic film using an Elmendorf-type tearing tester followed ASTM D 1922.

Seal strength: Seal strength is the test method measures the force required to separate a test strip of material containing the seal, that is not only relevant to opening force and package integrity, but to measuring the packaging processability to produce consistent seals. Seal strength at some minimum level is a necessary package requirement, and at times it is desirable to limit the strength of the seal to facilitate opening.

Melt strength and Draw down ratio (DD): They are determined using GOEFFERT Rheotens. The melt extrudate is performed by single screw extruder with 2 mm die diameter at melt temperature 190° C. the extrudate pass through Rheotens haul-off with controlled the ramp speed. The haul-off force is record. The force (N) is collect as a function of draw ratio (DD). Melt strength and draw down ratio is define as the force at break and draw down ratio at break, respectively.

EXAMPLES

To prepare an inventive film from the above inventive compositions, it was surprisingly found that a sub-range of the multimodal polyethylene composition which might be obtained using the inventive reactor system is particularly preferred. In detail, it was found that compositions suitable to form the inventive film are as follows and have the following properties. The following comparative examples refer to the film related compositions.

Example 1 (E1)

The inventive example E1 was produced according to the inventive process for making multimodal polyethylene composition wherein;
the density of the ultra high molecular weight polyethylene and the high molecular weight polyethylene copolymer is in the same range and both densities are in the range from 0.910 to 0.940 g/cm$^3$; and, wherein the polydispersity index of the multimodal polyethylene composition is from 18 to 30, preferably 20 to 28, measured by gel permeation chromatography.

Example 2 (E2)

The inventive example E2 is the multimodal polyethylene composition produced by inventive process and having polymer as shown in table 3 in the range of claims with MI2 of 0.07 g/10 min and density of 0.9470 g/cm3. It shows good processing in film production and higher output rate with maintaining properties in particular dart drop impact and tear strength at 45 micron film thickness.

Comparative Example (CE1)

The comparative example CE1 was produced according to the inventive process for making multimodal polyethylene composition where in the density of the ultra high molecular weight polyethylene and the high molecular weight polyethylene copolymer is not the same. Also the density and polydispersity index is out of the specific range for high impact film.

TABLE 1

Process condition of inventive example (E1 and E2) and comparative example (CE1)

| Condition | Unit | Comparative Example CE1 | Inventive Example E1 | Inventive Example E2 |
|---|---|---|---|---|
| 1st Reactor | | | | |
| Split ratio | % | 46-49 | 45-47 | 45-48 |
| Temperature | (° C.) | 78-81 | 81-85 | 81-85 |
| Pressure | kPa | 800-850 | 600-650 | 600-650 |
| Hydrogen flow rate | NL/h | 220 | 229 | 235 |
| 2nd Reactor | | | | |
| Split ratio | % | 15-20 | 10-12 | 11-14 |
| Temperature | (° C.) | 70-75 | 70-75 | 70-75 |
| Pressure | kPa | 230-280 | 150-300 | 150-300 |
| Hydrogen flow rate | NL/h | 0 | 0 | 0 |
| Co-monomer | kg/h | 0.69 | 0.71 | NA |
| Comonomer/ Ethylene Feed | — | 0.216 | 0.222 | NA |
| H2 removal | | 99.6 | 98.9 | 99.4 |
| Comonomer type | — | 1-butene | 1-butene | 1-Butene |
| 3rd Reactor | | | | |
| Split ratio | % | 32-35 | 40-41 | 39-42 |
| Temperature | (° C.) | 70-75 | 70-75 | 70-75 |
| Pressure | kPa | 300-400 | 150-300 | 150-300 |
| Hydrogen flow rate | NL/h | 9.5 | 9.3 | 9.1 |
| Co-monomer | kg/h | 0.80 | 0.75 | 0.8160 |
| Comonomer/ Ethylene Feed | — | 0.073 | 0.068 | 0.0737 |
| Comonomer type | — | 1-butene | 1-butene | 1-Butene |

Comparative Example 2 (CE2)

The comparative example 2 (CE2) is the polyethylene blend consisting of 60 wt % bimodal HDPE, 20 wt % LLDPE with 1-butene comonomer and 20 wt % LLDPE with 1-Octene comonomer where in;
HDPE is the commercial resin EL-Lene™ H5604F with MI$_2$ of 0.03 g/10 min and density of 0.958 g/cm$^3$
LLDPE with 1-butene comonomer is the commercial resin Dow™ Butene 1211 with MI$_2$ of 1.0 g/10 min and density of 0.918 g/cm$^3$
LLDPE with 1-Octene comonomer is the commercial resin Dowlex™ 2045G with MI$_2$ of 1.0 g/10 min and density of 0.922 g/cm$^3$ It is generally known that the blend of HDPE with LLDPE is the practical way in film manufacturing to get better film strength in particular dart drop impact and tear strength.

From the molding composition so prepared, a film was produced in the following way. A film having a thickness of 45 micron was produced on the internal blown film machine comprising a single screw extruder connecting with tubular blow film apparatus. The temperature setting from extruder to the die is from 175 to 205° C. The screw speed and nip roll take up speed are 60 rpm and 20 rpm, respectively. The film were produced at a blow-up ratio of 4:1 and a neck height of 30 cm with bubble diameter of 23 cm and film lay flat of 39 cm.

The films were further evaluated for processability and mechanical properties in both machine direction, MD and transverse direction, TD as shown in table 2.

| Example | Mw, fraction A (g/mol) | Mw, fraction B (g/mol) | Mw, fraction C (g/mol) |
|---|---|---|---|
| E1 | 49,542 | 998,032 | 199,713 |
| E2 | 53,771 | 999,438 | 212,888 |

The comparative example CE1 produced according the inventive process with the composition out of the specific range of multimodal polyethylene composition for high impact film. The bubble was found to be oscillating during the film forming. The melt fracture and gel were found and effect to the overall film appearance. So the film was not further evaluated for mechanical properties. It was supposed that too much ultrahigh molecular weight was incorporated in the comparative example CE1. The problem was not found in the inventive example E1 and E2 which produced

TABLE 2

Properties of polyethylene compositions and film thereof.

| Properties | Comparative Example CE1 | Comparative Example CE2 | Inventive Example E1 | Inventive Example E2 |
|---|---|---|---|---|
| Resin | | | | |
| MI$_2$, g/10 min | 0.049 | 0.221 | 0.03 | 0.07 |
| MI$_2$ of LMW, g/10 min | 640 | N/A | 729 | 573 |
| Density, g/cm$^3$ | 0.942 | 0.942 | 0.948 | 0.947 |
| Density of HMW1, g/cm$^3$ | 0.942 | N/A | 0.924 | 0.921 |
| Density of HMW2, g/cm$^3$ | 0.903 | N/A | 0.929 | 0.928 |
| Mn, g/mol | 8,104 | 10,992 | 10,960 | 11,466 |
| Mw, g/mol | 259,821 | 237,557 | 250,707 | 264,346 |
| Mz, g/mol | 2,231,636 | 1,886,133 | 1,530,608 | 1,527,506 |
| PDI | 32.1 | 21.6 | 22.9 | 23.0 |
| Melt strength at break, N | N/A | 0.22 | 0.24 | 0.23 |
| Draw down ratio at break | N/A | 10.9 | 11.3 | 11.5 |
| Film | | | | |
| Film Thickness, micron | 45 | 45 | 45 | 45 |
| Output, kg/hr | N/A | 15 | 17 | 18 |
| Bubble Stability | Oscillating | Good | Good | Good |
| Dart drop impact, g | N/A | 203 | 343 | 285 |
| Tensile Strength at Break (MD), kg/cm$^2$ | N/A | 501 | 535 | 481 |
| Tensile Strength at Break (TD), kg/cm$^2$ | N/A | 325 | 519 | 419 |
| Elongation at Break (MD), % | N/A | 736 | 763 | 672 |
| Elongation at Break (TD), % | N/A | 738 | 764 | 844 |
| Tear Strength (MD), g | N/A | 83 | 92 | 84 |
| Tear Strength (TD), g | N/A | 583 | 428 | 541 |
| Puncture Energy, N-cm/u | N/A | 11.11 | 11.82 | 9.75 |
| Max Seal strength @140 C. (kgf) | N/A | 2.019 | 2.141 | NA | according to the inventive process with the specific range of multimodal polyethylene composition for high impact film. The results obviously showed the significantly improvement of output and mechanical properties including dart drop impact and tensile strength over the comparative example CE2 even the LLDPE is included in the formulation. Other properties are mostly equivalent to the blend of HDPE with LLDPE.

The evidence supports that the multimodal polyethylene composition produced according to the inventive process with specific range of multimodal polyethylene composition provides a good balance of mechanical strength with processing properties for industrial film and geomembrane.

The features disclosed in the foregoing description and in the claims may, both separately and in any combination, be material for realizing the invention in diverse forms thereof.

The invention claimed is:

1. A multimodal polyethylene composition comprising:
   (A) 44 to 50 parts by weight of a low molecular weight polyethylene homopolymer having a weight average molecular weight (Mw) of 49,542 to 53,771 g/mol, wherein the low molecular weight polyethylene has a M2 of 500 to 1,000 g/10 min according to ASTM D 1238;
   (B) 10 to 15 parts by weight of a first high molecular weight polyethylene having a weight average molecular weight (Mw) of 998,032 to 999,438 g/mol wherein the first high molecular weight polyethylene is a copolymer of ethylene and 1-butene; and
   (C) 39 to 45 parts by weight of a second high molecular weight polyethylene having a weight average molecular weight (Mw) of 199,713 to 212,888 g/mol, wherein the second high molecular weight polyethylene is a copolymer of ethylene and 1-butene,
   wherein the density of the first high molecular weight polyethylene and the second high molecular weight polyethylene is in the same range and both densities are in the range from 0.910 to 0.940 g/cm$^3$; and
   the polydispersity index (PDI) of the multimodal polyethylene composition is from 22 to 24, measured by gel permeation chromatography.

2. The multimodal polyethylene composition according to claim 1, wherein the multimodal polyethylene composition has a weight average molecular weight from 150,000 to 400,000 g/mol, measured by Gel Permeation Chromatography.

3. The multimodal polyethylene composition according to claim 1, wherein the multimodal polyethylene composition has a number average molecular weight from 5,000 to 15,000 g/mol, measured by Gel Permeation Chromatography.

4. The multimodal polyethylene composition according to claim 1, wherein the multimodal polyethylene composition has a Z average molecular weight from 1,000,000 to 3,000,000 g/mol, measured by Gel Permeation Chromatography.

5. The multimodal polyethylene composition according to claim 1, wherein the multimodal polyethylene composition has a density of at least 0.940 g/cm$^3$, according to ASTM D 1505 and/or MI$_2$ from 0.03 to 0.10 g/10 min.

6. The multimodal polyethylene composition according to claim 5, wherein the MI$_2$ is from 0.03 to 0.08 g/10 min.

7. A film comprising the multimodal polyethylene composition according to claim 1, wherein the film has a thickness from 40 to 120 μm.

8. An industrial bag or a geomembrane comprising the film according to claim 7.

9. The multimodal polyethylene composition of claim 1, wherein the polydispersity index is from 22 to 23.

10. The multimodal polyethylene composition of claim 2, wherein the weight average molecular weight is from 200,000 to 300,000 g/mol, measured by Gel Permeation Chromatography.

11. The multimodal polyethylene composition of claim 3, wherein the number average molecular weight is from 7,000 to 13,000 g/mol, measured by Gel Permeation Chromatography.

12. The multimodal polyethylene composition of claim 4, wherein the Z average molecular weight is from 1,000,000 to 2,500,000 g/mol, measured by Gel Permeation Chromatography.

13. The multimodal polyethylene composition of claim 5, wherein the density is from 0.940 to 0.948 g/cm$^3$, according to ASTM D 1505.

14. The film of claim 7, having a thickness from 45 to 80 μm.

* * * * *